United States Patent
Smejkalova

(10) Patent No.: US 7,646,593 B2
(45) Date of Patent: Jan. 12, 2010

(54) ADJUSTABLE LAPTOP MONITOR APPARATUS

(76) Inventor: Vladislava Smejkalova, 89 Rue de Maubeuge, Paris (FR) 75010

(*) Notice: Subject to any disclaimer, the term of this patent is extended or adjusted under 35 U.S.C. 154(b) by 226 days.

(21) Appl. No.: 11/678,606

(22) Filed: Feb. 25, 2007

(65) Prior Publication Data

US 2008/0204983 A1    Aug. 28, 2008

(51) Int. Cl.
 - *G06F 1/16* (2006.01)
 - *H05K 5/00* (2006.01)
 - *H05K 7/00* (2006.01)

(52) U.S. Cl. .............. 361/679.27; 361/679.21; 361/679.26

(58) Field of Classification Search .......... 361/681, 361/679.21, 679.26, 679.27, 679.55
See application file for complete search history.

(56) References Cited

U.S. PATENT DOCUMENTS

| | | | | | |
|---|---|---|---|---|---|
| 4,618,119 | A * | 10/1986 | Powell | | 248/456 |
| 5,012,852 | A * | 5/1991 | Blackhurst | | 160/351 |
| 6,517,040 | B1 * | 2/2003 | Wen | | 248/278.1 |
| 6,585,201 | B1 * | 7/2003 | Reed | | 248/181.1 |
| 6,712,321 | B1 * | 3/2004 | Su et al. | | 248/123.11 |
| 6,938,869 | B2 * | 9/2005 | Lin et al. | | 248/414 |
| 6,963,485 | B2 * | 11/2005 | Hong | | 361/683 |
| 7,068,497 | B2 * | 6/2006 | Chu | | 361/681 |
| 7,099,148 | B2 * | 8/2006 | Lee | | 361/681 |
| 7,168,665 | B2 * | 1/2007 | Hong et al. | | 361/682 |
| 7,215,538 | B1 * | 5/2007 | Chen et al. | | 361/683 |
| 7,233,488 | B2 * | 6/2007 | Liou et al. | | 361/682 |
| 7,251,128 | B2 * | 7/2007 | Williams et al. | | 361/679.55 |
| 7,301,759 | B2 * | 11/2007 | Hsiung | | 361/681 |
| 2003/0086240 | A1 * | 5/2003 | Jobs et al. | | 361/681 |
| 2004/0004165 | A1 * | 1/2004 | Hong et al. | | 248/132 |
| 2004/0066614 | A1 * | 4/2004 | Hong | | 361/681 |
| 2004/0084588 | A1 * | 5/2004 | Liu et al. | | 248/291.1 |
| 2004/0165344 | A1 * | 8/2004 | Lee | | 361/681 |
| 2005/0041172 | A1 * | 2/2005 | Chin | | 349/58 |
| 2005/0050784 | A1 * | 3/2005 | Bang et al. | | 40/607.01 |
| 2005/0051693 | A1 * | 3/2005 | Chu | | 248/371 |
| 2006/0145046 | A1 * | 7/2006 | Liou et al. | | 248/455 |
| 2007/0040084 | A1 * | 2/2007 | Sturman et al. | | 248/280.11 |
| 2007/0047188 | A1 * | 3/2007 | Kim | | 361/681 |
| 2007/0064379 | A1 * | 3/2007 | Shin | | 361/681 |
| 2007/0097609 | A1 * | 5/2007 | Moscovitch | | 361/681 |
| 2008/0080126 | A1 * | 4/2008 | Huang et al. | | 361/681 |

* cited by examiner

*Primary Examiner*—Jayprakash N Gandhi
*Assistant Examiner*—Adrian S Wilson
(74) *Attorney, Agent, or Firm*—Jennifer Meredith; Meredith & Keyhani, PLLC

(57) ABSTRACT

An adjustable laptop computer monitor assembly, comprising: a flat panel display assembly comprising a display screen and support electronics for the display screen; a computer base that houses an associated microprocessor and a portion of the support electronics for the display screen; at least one support mechanism attached to the computer base and to the laptop screen, wherein the at least one support mechanism allows the display screen to move vertically and also in other directions relative to the computer.

20 Claims, 20 Drawing Sheets

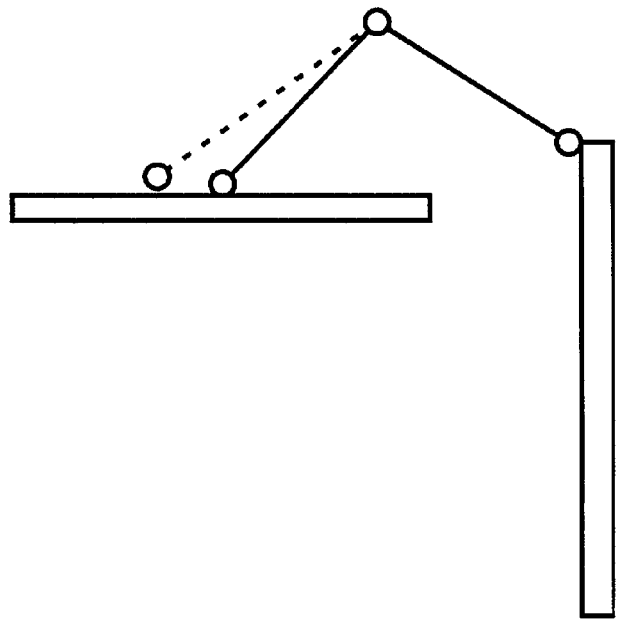
Figure 13 B
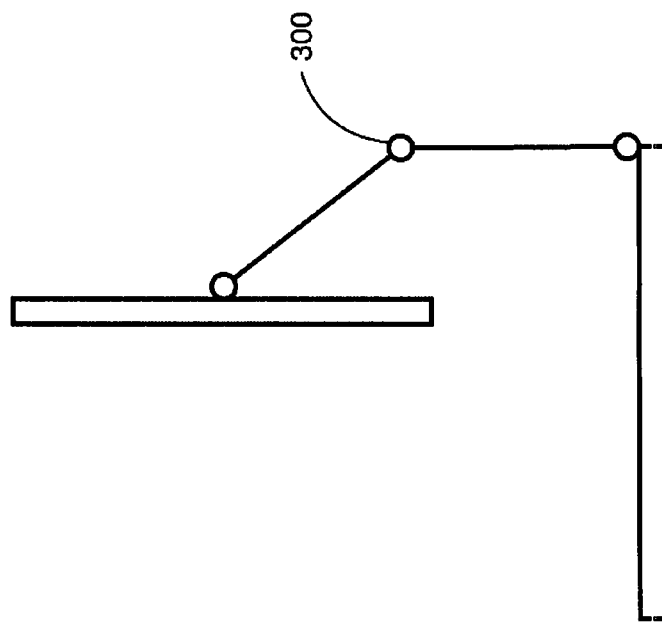
300
Figure 13 A
Figure 13

Figure 17
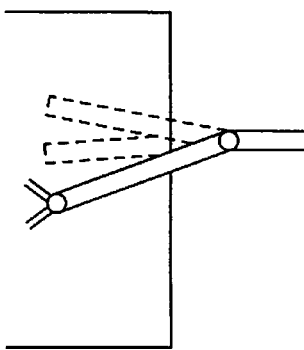
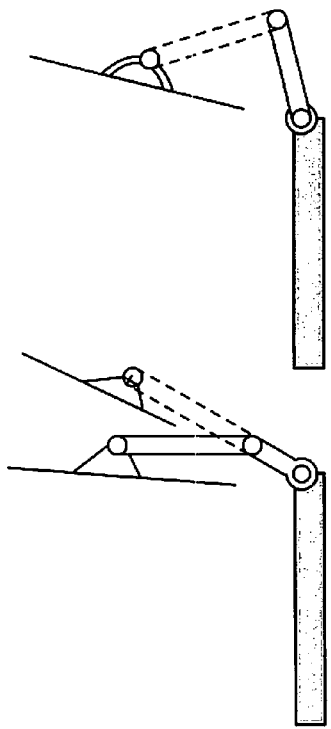
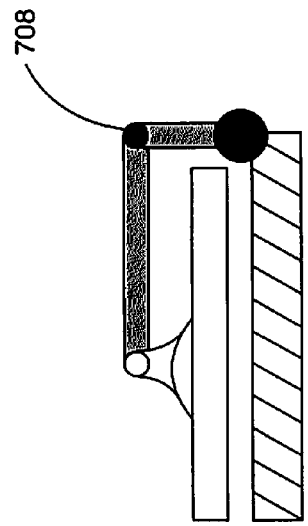
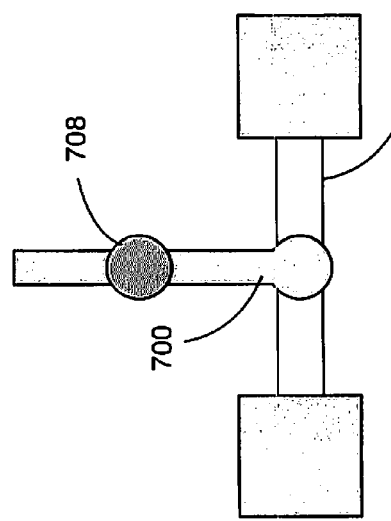

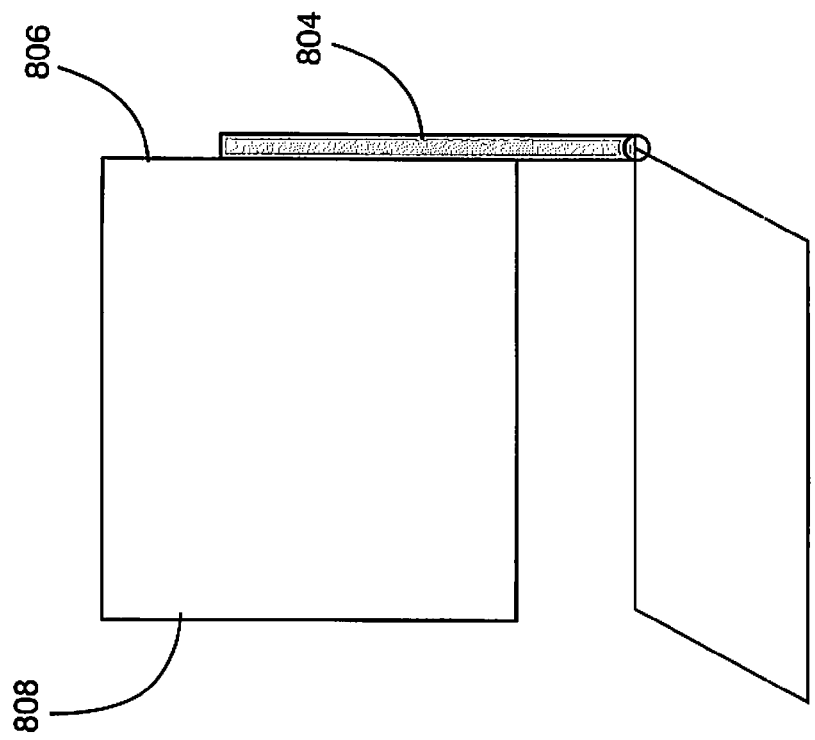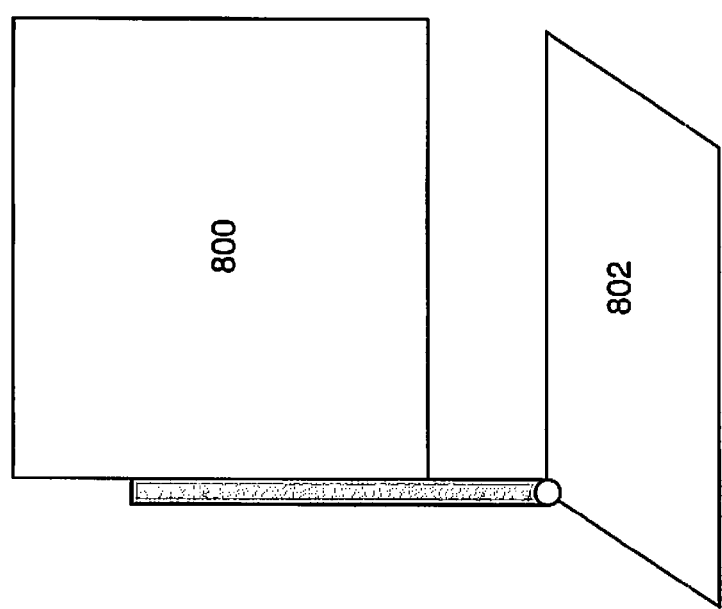
Figure 18

ADJUSTABLE LAPTOP MONITOR APPARATUS

The present invention relates to laptop computer stands and more particularly to a integrated laptop monitor extender apparatus that allows for a laptop monitor to be adjusted according to the user.

A significant disadvantage of laptop computers is that the height requires the user to look down at an angle. The prior art has attempted to address this by providing docking stations. Docking stations allow the user to plug their laptop into a dock, which allows the laptop to be used as a standard desktop. This is not portable, though, and requires a good deal of extra equipment, which is undesirable. An example of a docking station is disclosed in U.S. Pat. No. 5,822,185 issued to Cavello.

Laptop computers are very popular for their portability and space saving. Typically, a laptop monitor pivotally adjusts relative to the keyboard. One attempt to provide adaptability has been to provide a detachable keyboard, as disclosed by U.S. Pat. No. 5,247,285 issued to Yokota. However, the additional layer of the keyboard and the keyboard holder substantially increases the thickness of the laptop. This makes the laptop bigger which in turn makes the laptop harder to carry and travel with. Also, this does not address the issue that many people prefer their monitor to be raised. Also, the laptop user may also prefer a pivot allowing the user to adjust for glare.

Accordingly, the present invention provides an adjustable laptop monitor display that adjust horizontal, vertically and pivotally.

SUMMARY OF THE INVENTION

The present invention relates generally to an adjustable laptop monitor.

According to one embodiment, an adjustable laptop computer monitor is assembly provided, comprising: a flat panel display assembly comprising a display screen and support electronics for the display screen; a computer base that houses an associated microprocessor and a portion of the support electronics for the display screen; at least one rail along a back portion of the display screen; at least one support mechanism in communication with the at least one rail and fixedly attached to the computer base, wherein the at least one support mechanism allows the display screen to move vertically relative to the computer.

According to another embodiment, an adjustable laptop computer monitor assembly is provided, comprising: a flat panel display assembly comprising a display screen and support electronics for the display screen; a computer base that houses an associated microprocessor and a portion of the support electronics for the display screen; at least one rail in communication with a back portion of the display screen and fixedly attached to the computer base; at least one support mechanism, wherein the at least one support mechanism is partially contained within the at least one rail and allows the display screen to move vertically relative to the computer; and at least one horizontal extender rail in communication with the at least one support mechanism at a 90 degree angle and contained within the back portion of the display screen.

According to yet another embodiment, an adjustable laptop computer monitor assembly, comprising: a flat panel display assembly comprising a display screen and support electronics for the display screen; a computer base that houses an associated microprocessor and a portion of the support electronics for the display screen; an attachment means; a support mechanism in communication with the attachment means on the back portion of the display screen and in pivotal communication with the computer base by a second pivot means, wherein the at least one support mechanism allows the display screen to move vertically and pivotally relative to the computer base.

According to yet another embodiment, an adjustable laptop computer monitor assembly is disclosed, comprising: a flat panel display assembly comprising a display screen and support electronics for the display screen; a computer base that houses an associated microprocessor and a portion of the support electronics for the display screen; at least one support mechanism, wherein the at least one support mechanism is rotatably attached to one side of the display screen and pivotally attached to the computer base, wherein the at least one support mechanism allows the display screen to move vertically and rotate relative to the computer.

These and other features, aspects and advantages of the present invention will become better understood with reference to the following description and claims.

BRIEF DESCRIPTION OF THE DRAWINGS

FIG. 13 is a side view according to the present invention;
FIG. 17A is a side view, 17B is a side view, 17C is a rear view, 17D is a side view according to the present invention;
FIG. 18 is a front view according to the present invention.

DETAILED DESCRIPTION OF THE INVENTION

Figure 1:
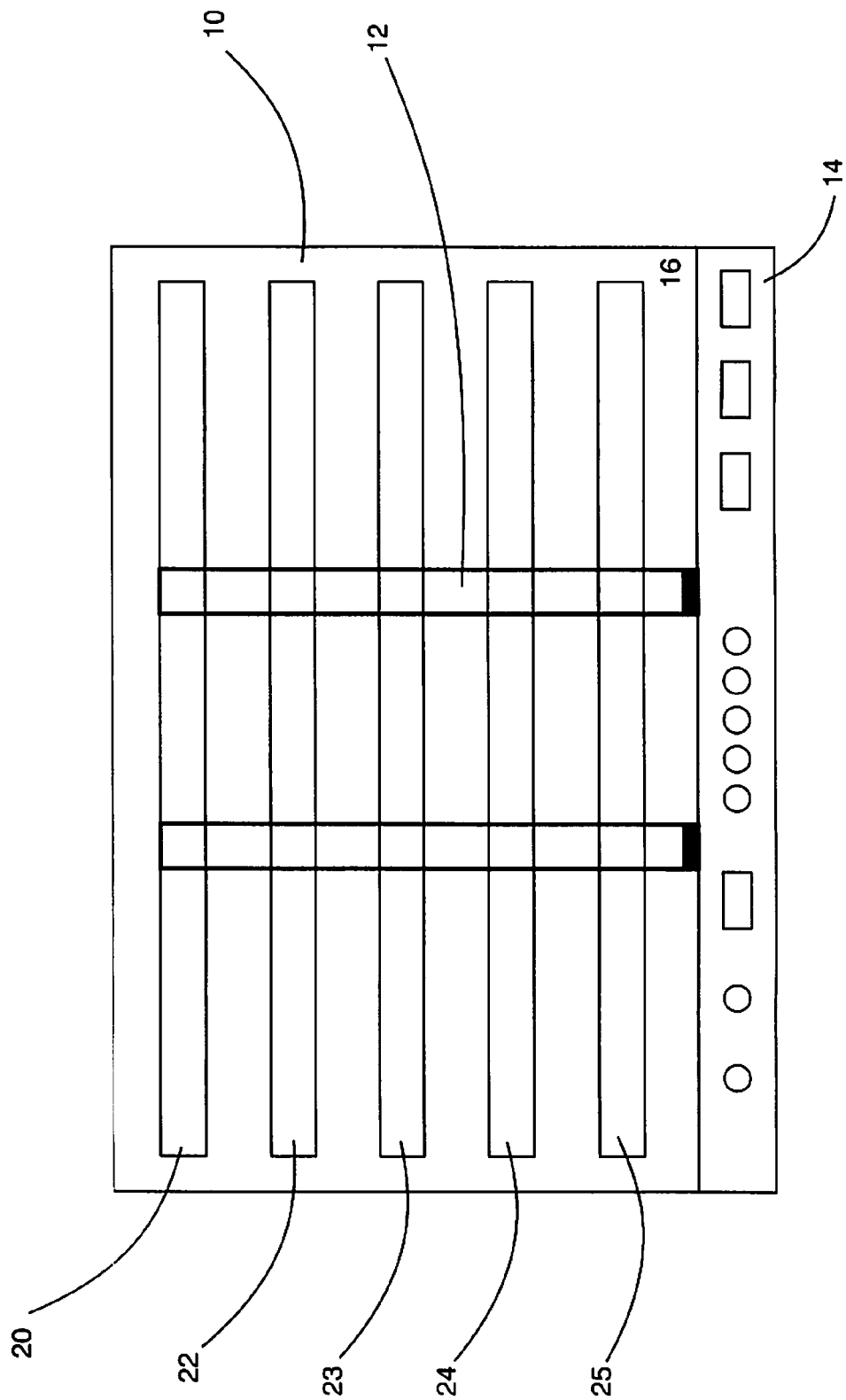
FIG. 1 is a rear view according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

As depicted in FIGS. 1-11, the present invention provides an adjustable laptop computer monitor assembly, comprising: a flat panel display assembly comprising a display screen (10) and support electronics (contained within 12) for the display screen (10); a computer base (14) that houses an associated microprocessor and a portion of the support electronics for the display screen (10); at least one rail (13, 15, 17, 19) is in communication within a back portion (16) of the display screen (10). The support mechanism (12) may be fixedly attached to the computer base (14), wherein the support mechanism (12) allows the display screen to move vertically relative to the computer. All support mechanisms shall allow folding the display screen with the laptop base to ensure easy portability of the laptop. Each support mechanism (12) may have a pivot hinge (38) at the bottom to allow the display screen (10) to open and close as in the laptop "clamshell" design shown in FIG. 1.

Figure 2:
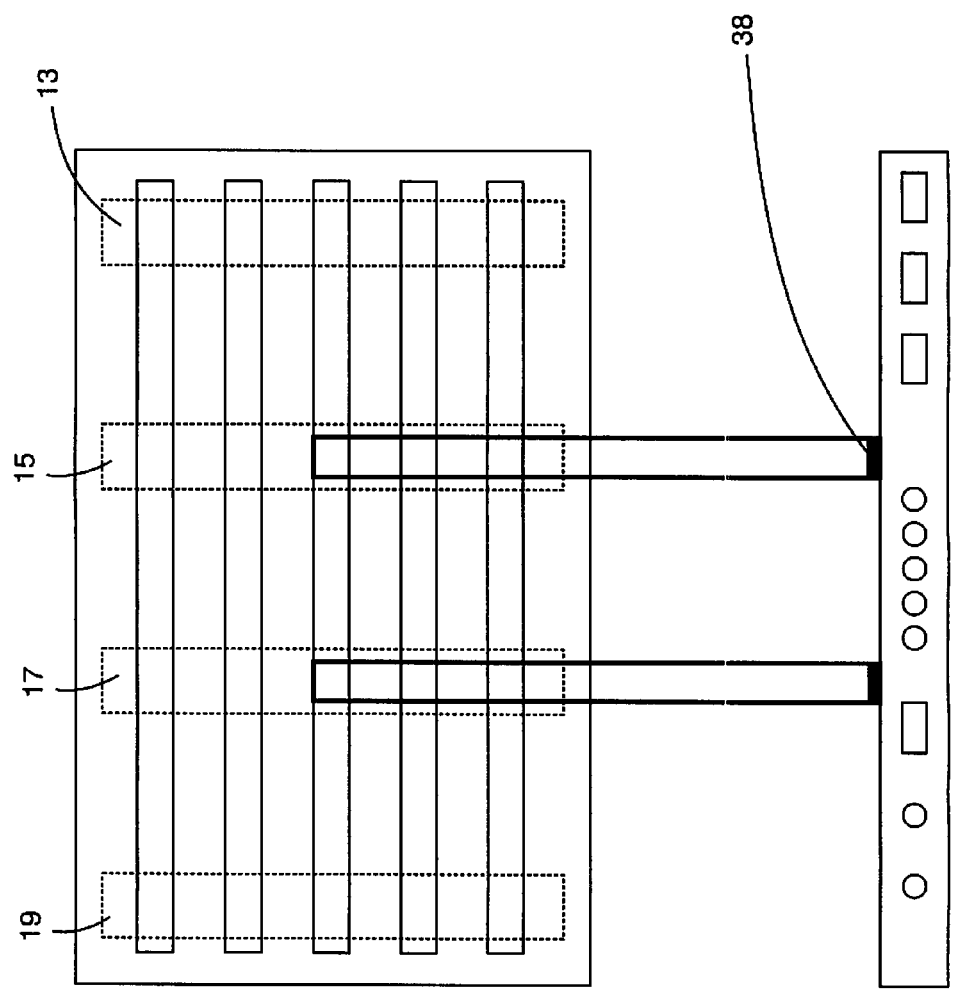
FIG. 2 is a rear view according to the present invention.
Figure 3:
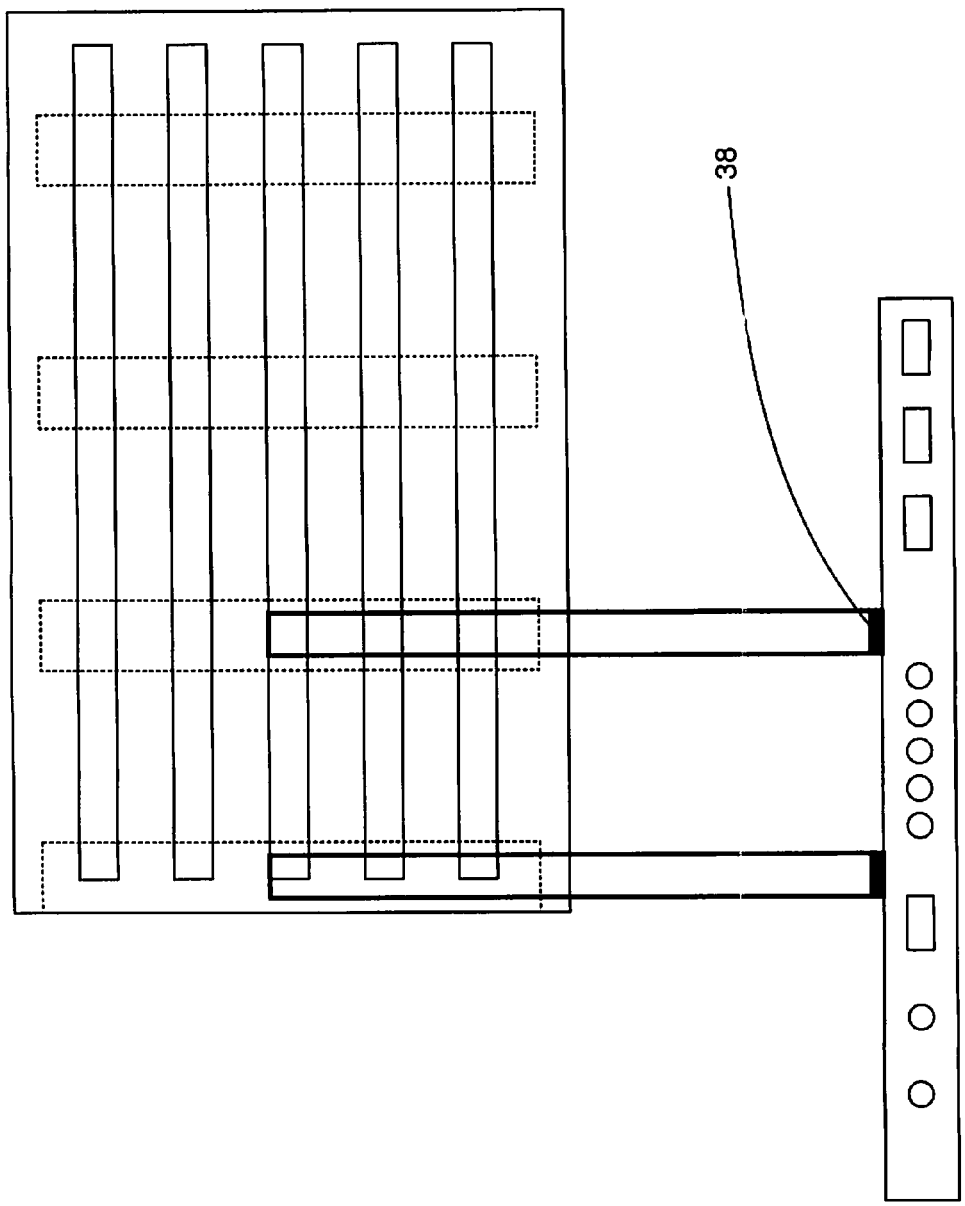
FIG. 3 is a rear view according to the present invention.
Figure 4:
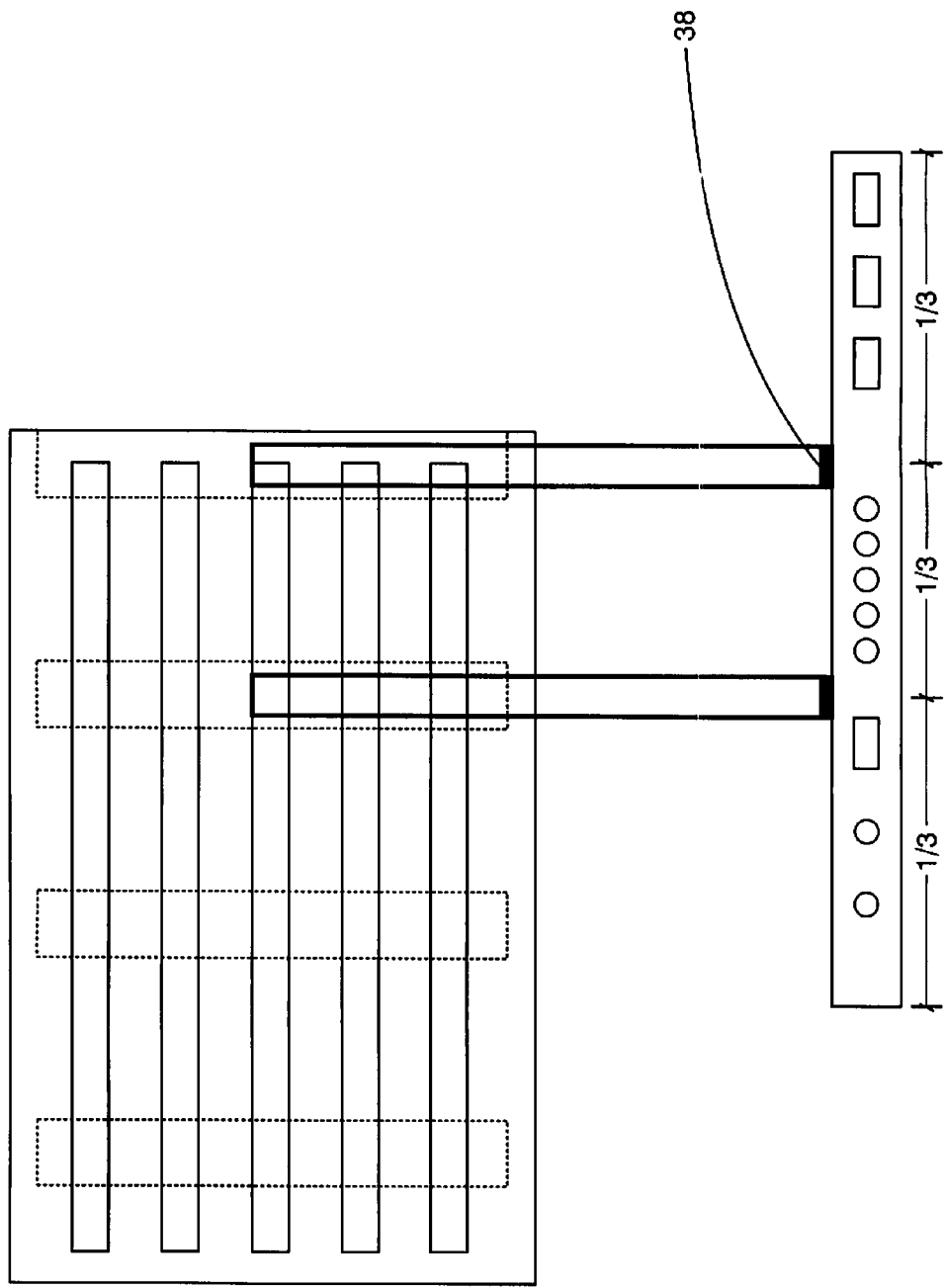
FIG. 4 is a rear view according to the present invention.
Figure 5:
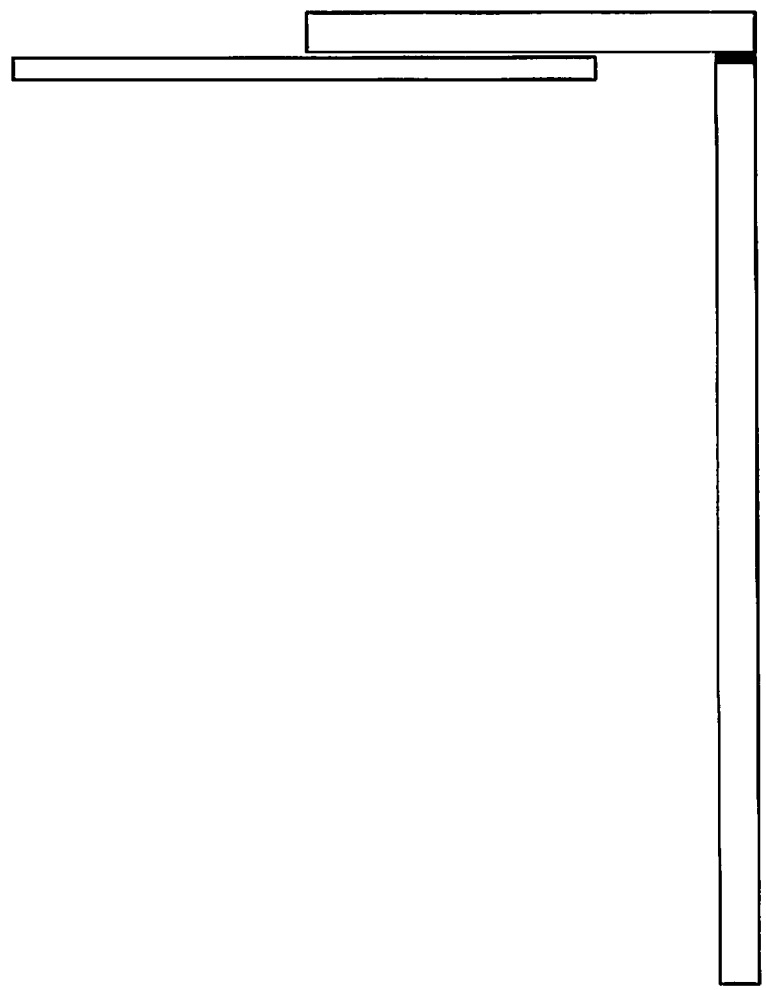
FIG. 5 is a side view according to the present invention.
Figure 6:
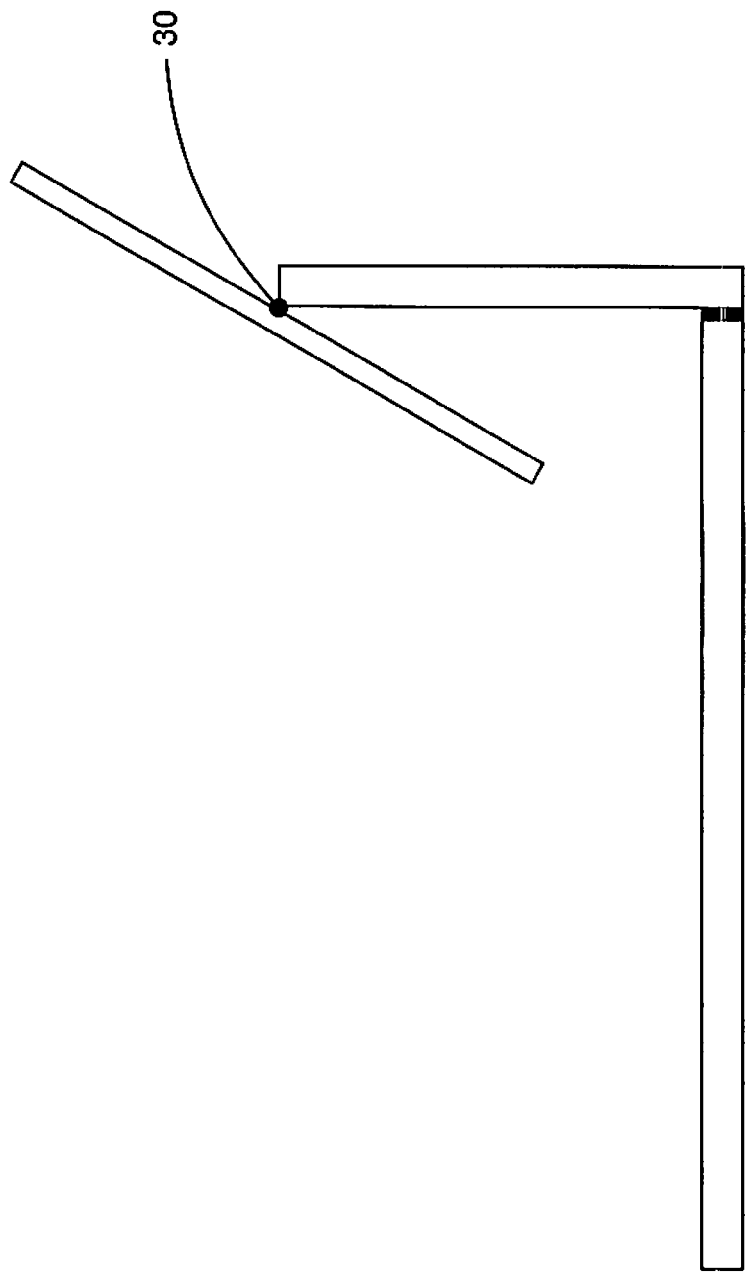
FIG. 6 is a side view according to the present invention.
Figure 7:
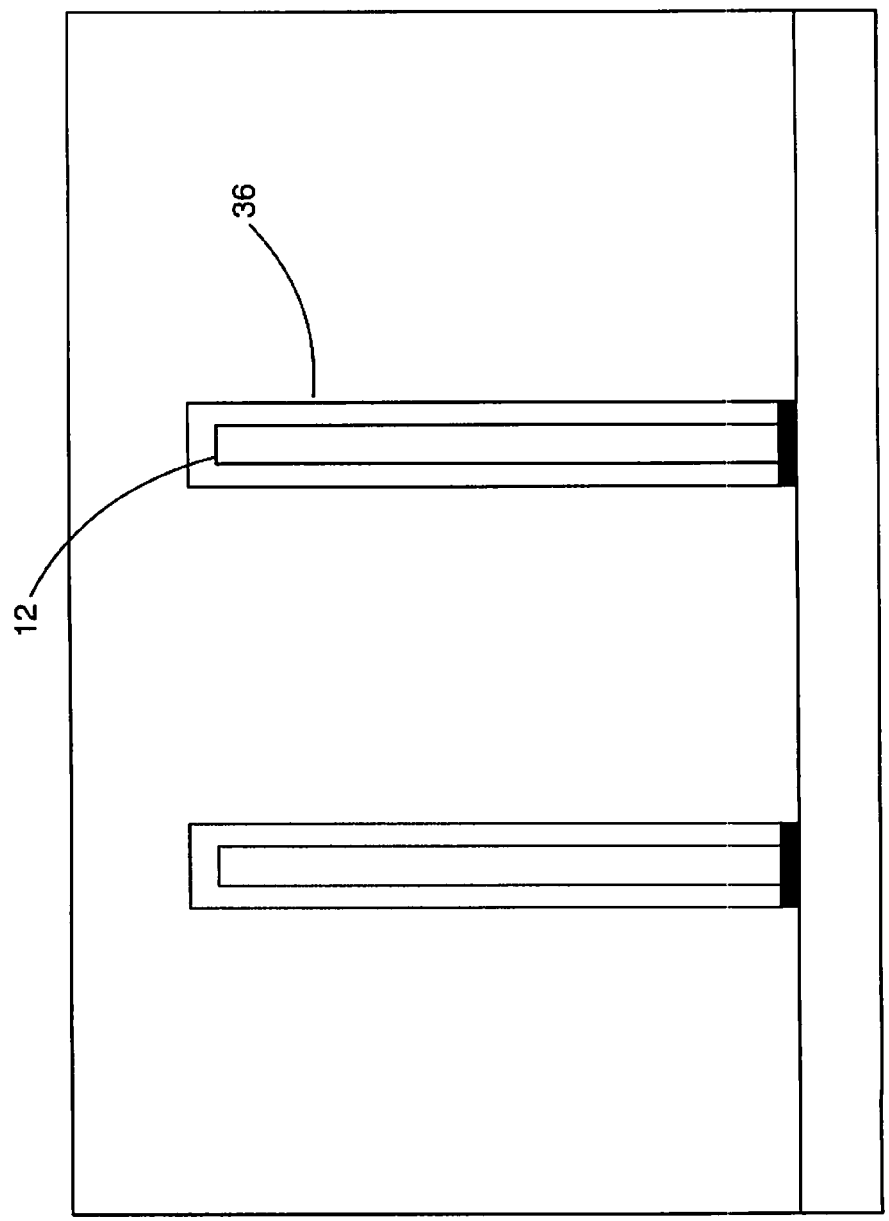
FIG. 7 is a rear view according to the present invention.
Figure 8:
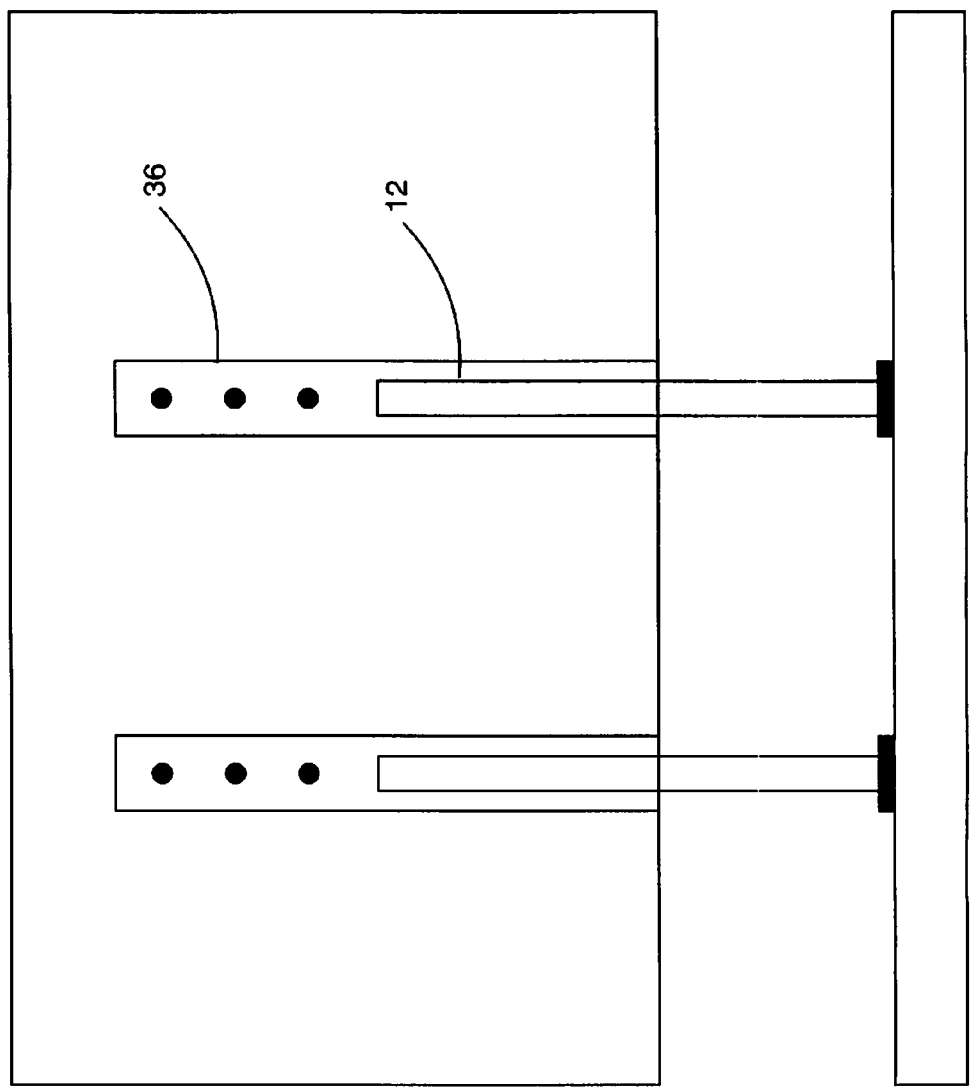
FIG. 8 is a rear view according to the present invention.
Figure 9:
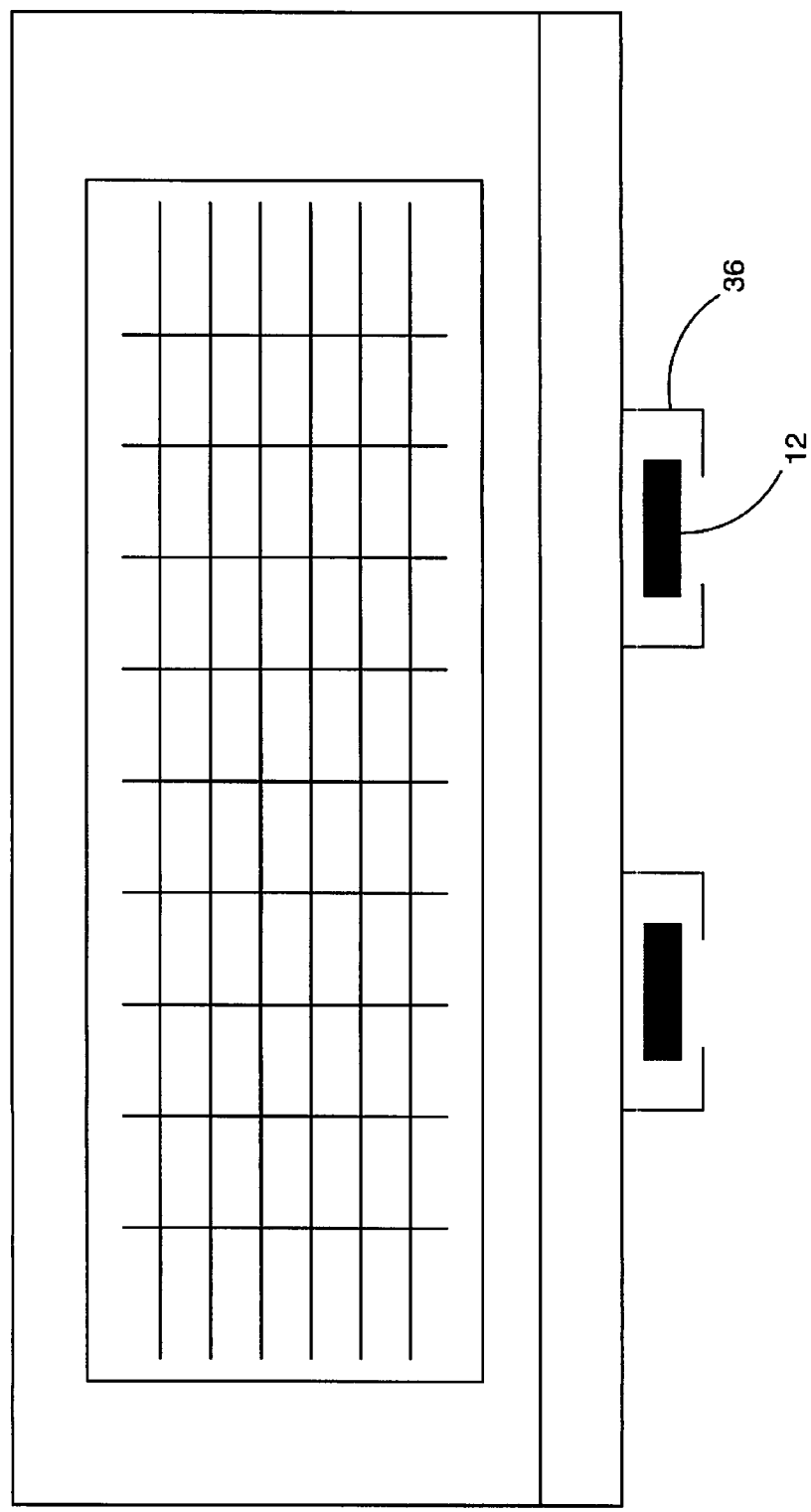
FIG. 9 is a top view according to the present invention.
Figure 10:
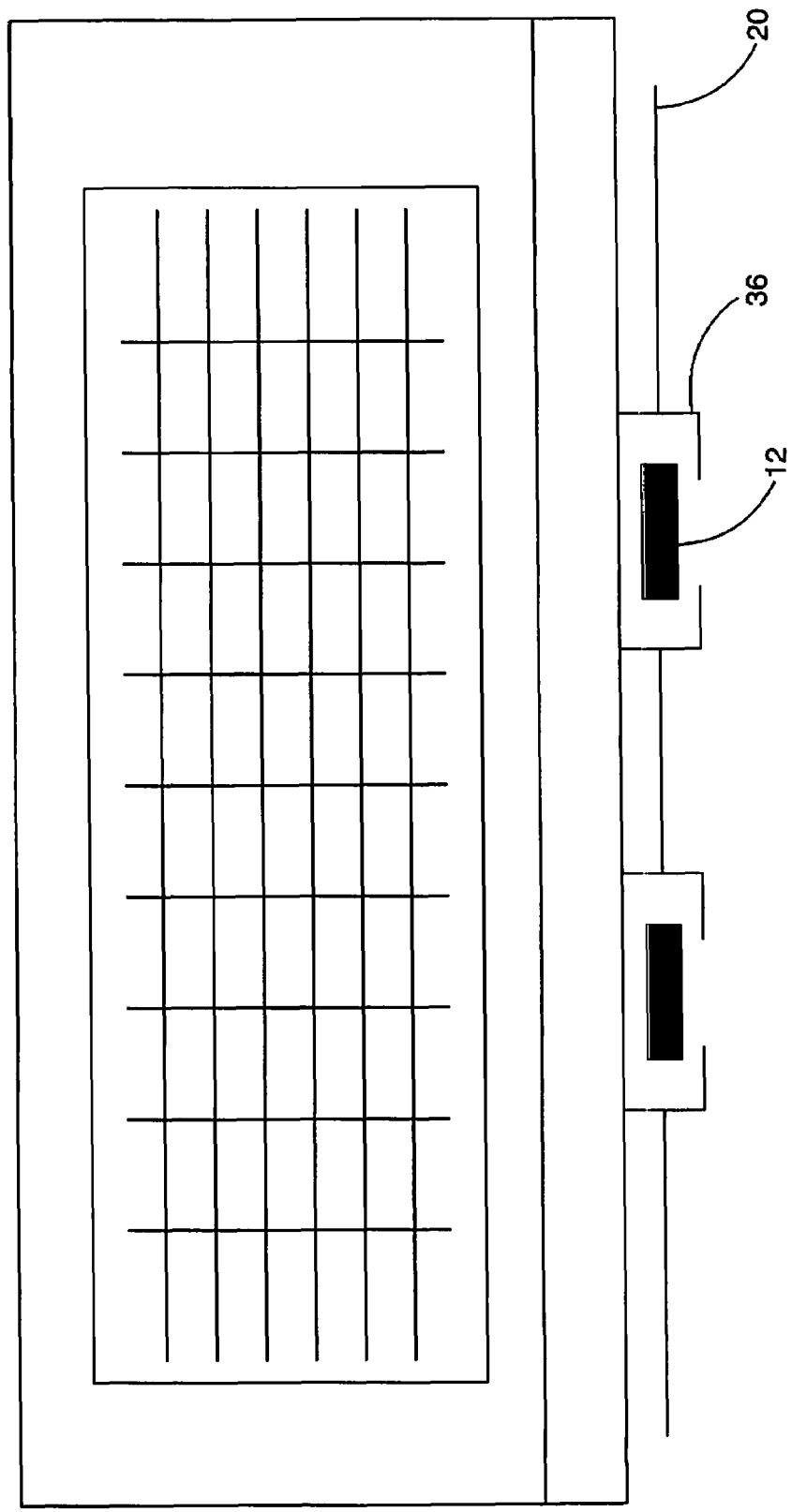
FIG. 10 is a top view according to the present invention.
Figure 11:
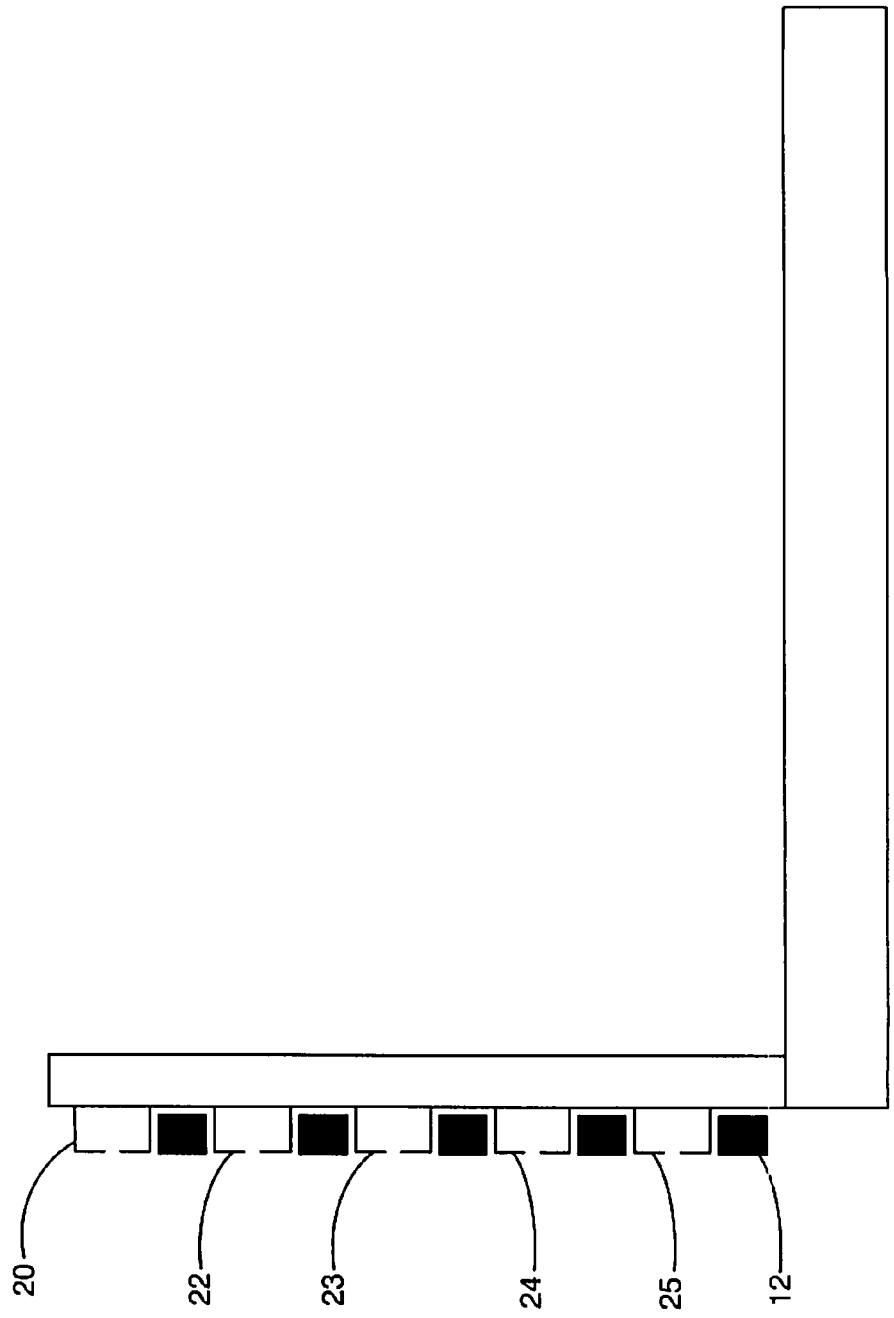
FIG. 11 is a side view according to the present invention.

According to one embodiment, there may be none or one or more or multiple horizontal extender rails (e.g. 20, 22, 23, 24 and 25) that allow the at least one support mechanism (12) to "stop" at each horizontal extender rails (as shown in FIG. 2) and be moved along the horizontal extender rail (23) to allow the display screen (10) to be moved vertically and horizontally. The may also be a rail (36) to receive each at least one support mechanism (12). It should be understood, though, that there may also be a number of ways in which the display screen (10) could move vertically including relative to the computer base (14). According to a preferred embodiment, as shown, there may be two support mechanisms (12) and they may be fixedly attached to the computer base. This allows the display screen (10) to move along the horizontal rails (20, 22, 23, 24, 25). If there were two rails at either side of the computer base, the display screen (10) would not be able to move horizontal relative to the computer base (14). FIG. 2 depicts the display screen (10) moved vertically relative to the computer base (14). FIG. 3 depicts the display screen (10) also moved horizontally relative to the computer base (14). Typically, the at least one horizontal extender rail (23) is in communication with the at least one support mechanism (12) at a 90 degree angle and contained within a rail (e.g. 13, 15, 17, 19) on a back portion of the display screen (10). While it is possible that the support mechanism (12) may be at other angles, this would result in the monitor being crooked for the user which would not typically be desirable as they would have to read at an angle. However, it is envisioned that there may be situations where this could be desirable, such as situations were the laptop is used in a rugged environment and would be sitting on an angled surface. The support electronics may be contained within the at least one support mechanism (12). There may also be a pivot hinge (30) at each end of the at least one support mechanism (12). The bottom end (38) would allow the display screen (10) to pivot relative to the computer base (14). The top end (30) hinge would allow the display screen (10) to pivot relative to the rails (12). As shown in FIGS. 7-8, there could be a receiving rail 36 that is slightly larger than the support mechanism (12) with grooves for positions that the support mechanism (12) could stop at to provide different heights for the display screen (10). FIGS. 9 depicts a top view of the embodiment shown in FIGS. 7 and 8. FIGS. 10 depicts a top view of the embodiment with horizontal extender rails e.g. 20, 22, 23, 24 and 25) as depicted in FIGS. 1-4. FIG. 11 depicts a side view of the embodiment with horizontal extender rails as depicted in FIGS. 1-4 and 11. The support electronics may also be in wireless communication with the associated microprocessor. The display screen may be selected from the group consisting of electroluminescent, Liquid Crystal Displays (LCD), plasma panel and field emission displays.

Figure 12:
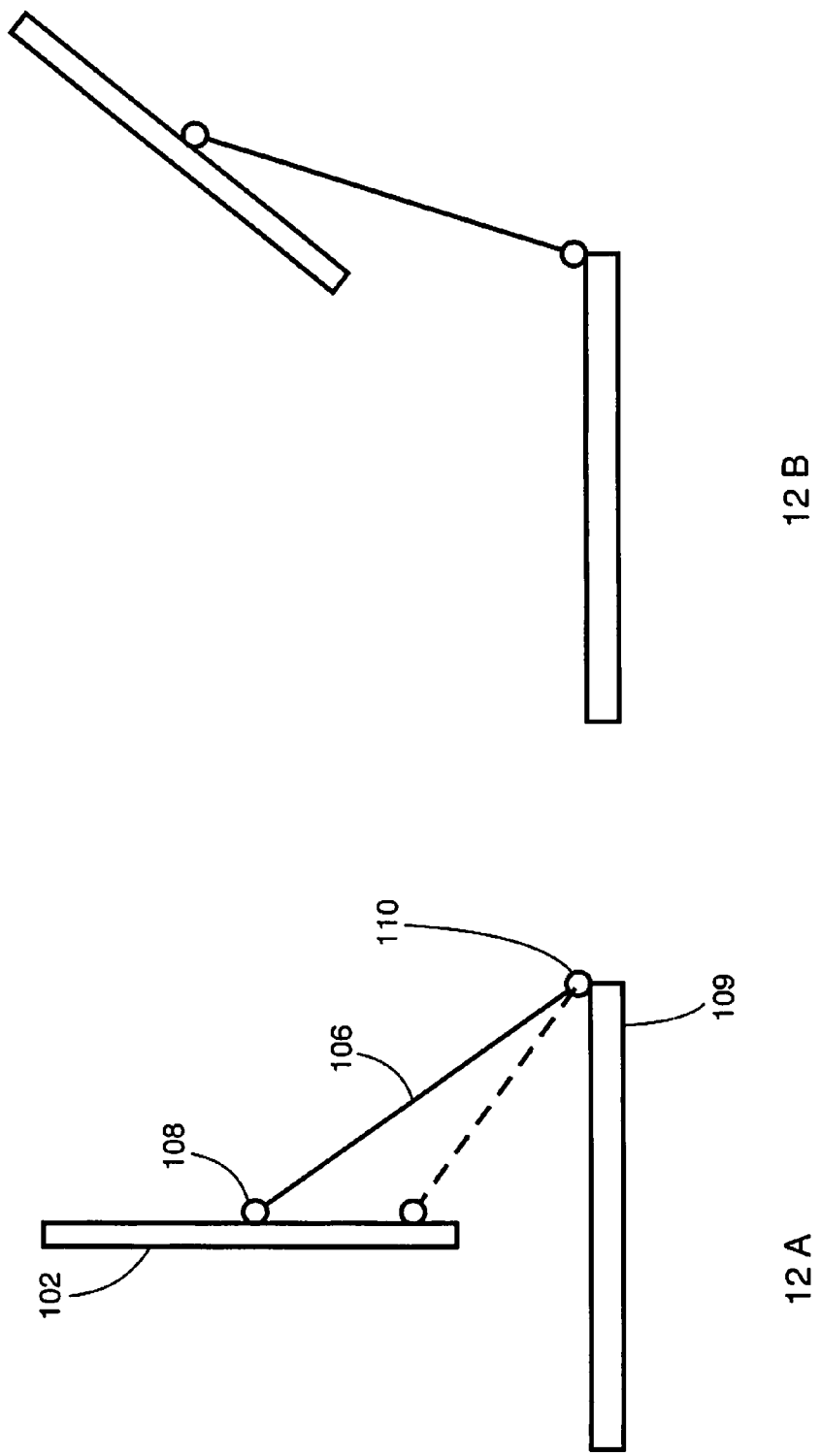
FIG. 12 is a side view according to the present invention.

FIGS. 12A and 12B depicts a adjustable laptop computer monitor assembly (100), comprising: a flat panel display assembly comprising a display screen (102) and support electronics for the display screen (102); a computer base (104) that houses an associated microprocessor and a portion of the support electronics for the display screen (102); there is a support mechanism (106) in pivotal communication with a back portion of the display screen (102) by a first pivot means (108) and pivotally fixedly attached to the computer base (104) by a second pivot means (110), wherein the support means (106), first pivot means (108) and second pivot means (110) allow the display screen to move pivotally relative to the computer base (104). The support mechanism may allow adjusting the display screen vertically by means of the rail, telescoping or other system. The support mechanism is also capable of folding the display screen to the laptop base.

Figure 14:
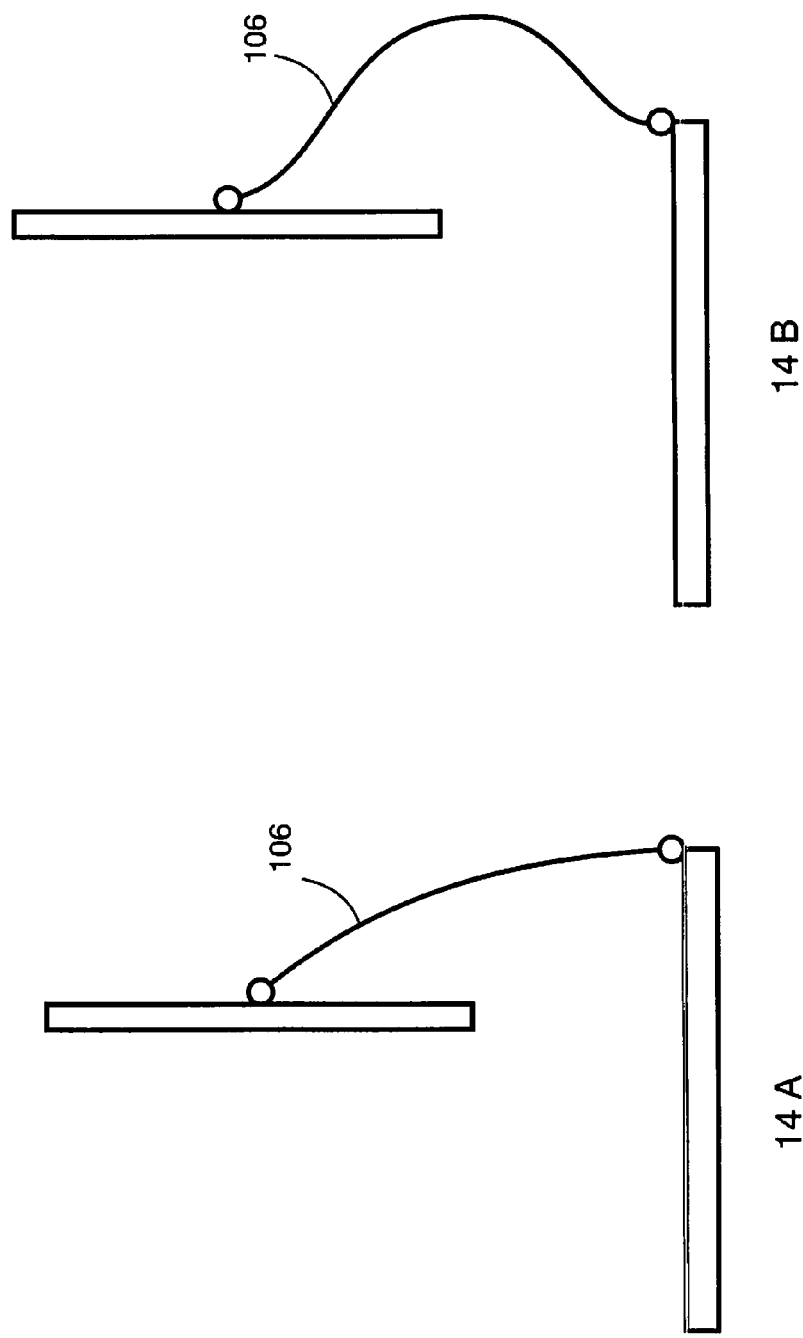
FIG. 14 is a side view according to the present invention.

FIGS. 13A-B depict an adjustable laptop computer monitor having at least one pivot means (300) in a portion of the support mechanism (106). It should be understood that the pivot means (300) are part of the support mechanism (106). As shown in FIG. 14, the support mechanism (106) may be flexible. The support mechanism allows adjusting the laptop screen's height by means of the rail, telescoping or other system. The support mechanism is also capable of folding the display screen to the laptop base.

Figure 15:
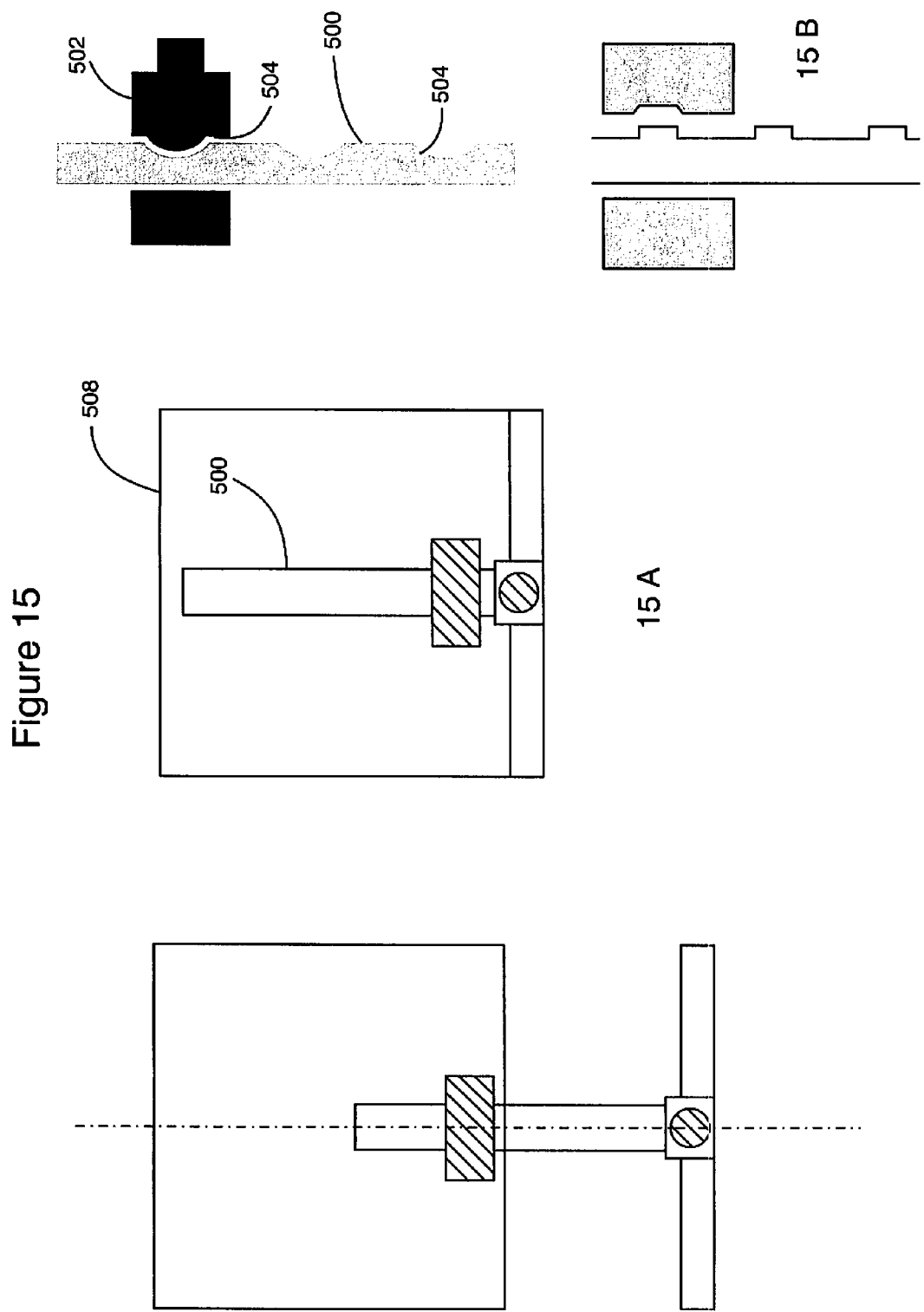
FIG. 15A is a rear view and FIG. 15B a side view according to the present invention.

FIG. 15 depicts an adjustable laptop computer monitor assembly wherein the support mechanism (500) has at least two cut outs (506) and an attachment means (502) having a release button (504), wherein the release button (504) accepts the extender rail (500) at each of the cut outs (506) and allows the monitor (508) to move along the support mechanism (500).

Figure 16:
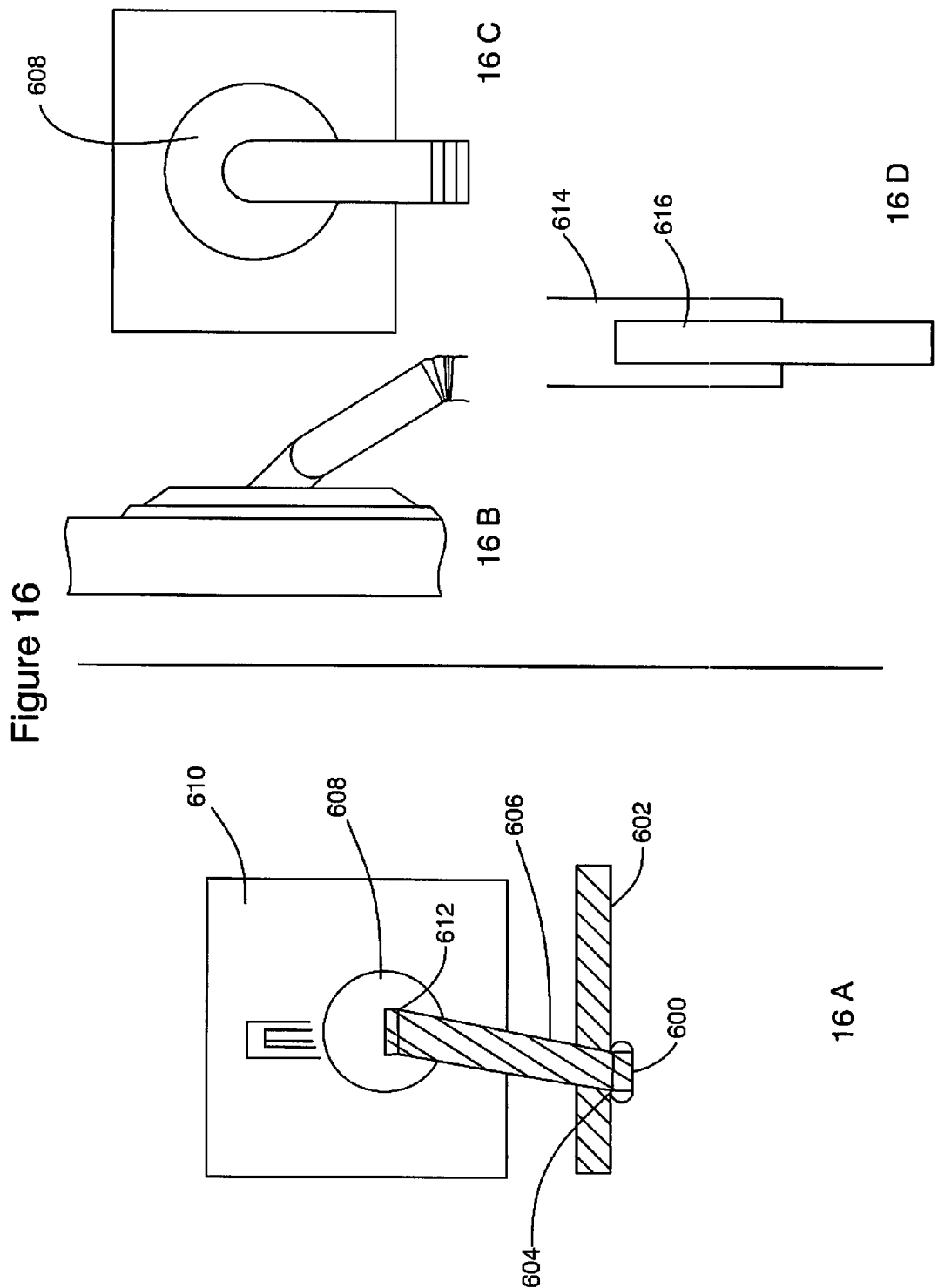
FIG. 16A is a rear view.
FIG. 16B is a side view.
FIG. 16C is a rear view and FIG. 16D is a rear view according to the present invention.
Figure 19:
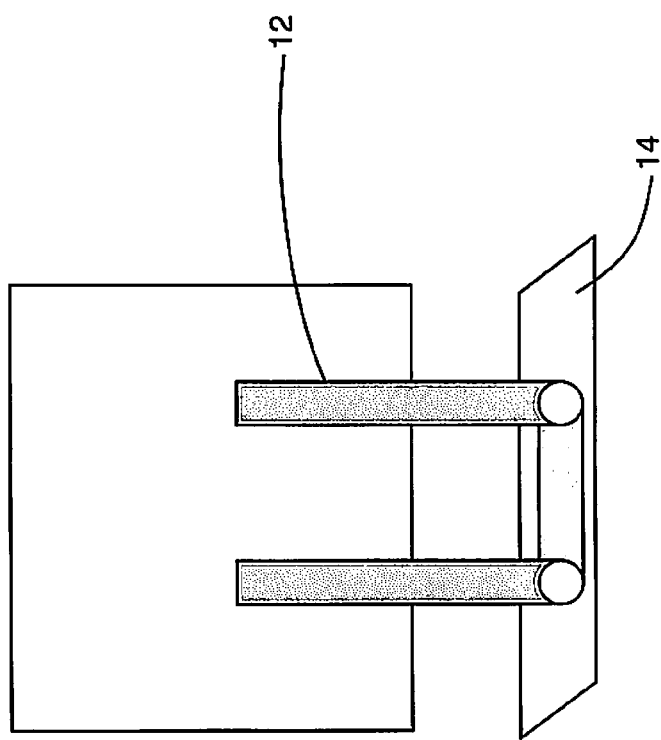
FIG. 19 is a rear view according to the present invention.
Figure 20:
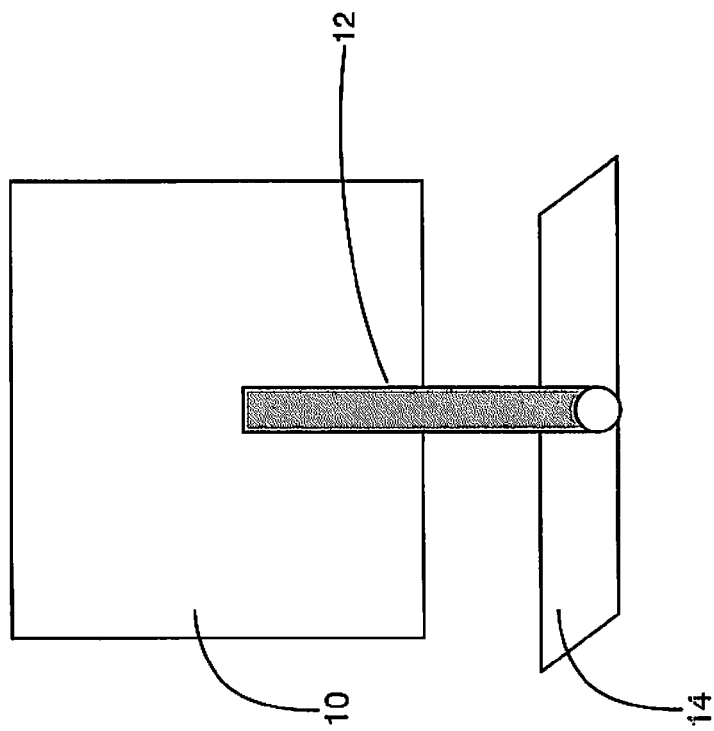
FIG. 20 is a rear view according to the present invention.

FIGS. 16A-16D depicts an adjustable laptop computer monitor assembly further comprising a pivot means (600) in communication with the computer base (602) and a first end (604) of the support mechanism (606) and an attachment means (608) in possibly rotatable and vertical communication with the laptop computer monitor assembly (610) and a second end of the support mechanism (612). FIG. 16A also implies possible usage of the telescoping system. A telescoping support mechanism may be accomplished in a number of ways. For example, that shown having an support mechanism having more than one part, one rail part (616) being smaller than the other second rail part (614) and the one rail part (616) fitting inside the second rail part (614). As shown in FIG. 16C, the attachment means (608) may also only rotate and pivot. The telescopic systems ensuring vertical movement of the laptop screen are also applicable for all embodiment of the present invention.

FIGS. 17A-17D depicts an adjustable laptop computer monitor assembly, further comprising at least one base pivot hinge (700) and a base rail (702), wherein the pivot hinge (700) is in communication with the support mechanism (702) and the base rail (702) and allows the support mechanism (704) to move along and in communication with the base rail (702). There may also be an additional pivot means (708) along the support mechanism (704) that allows the monitor (700) to fold away as well as more horizontally as depicted in FIG. 17C and vertically as depicted in FIG. 17D. There can also be other systems applied for vertical and other directional adjustments of the display screen with respect to the computer base.

FIG. 18 depicts an adjustable laptop computer monitor assembly, comprising: a flat panel display assembly comprising a display screen (800) and support electronics for the display screen; a computer base (802) that houses an associated microprocessor and a portion of the support electronics for the display screen; a support mechanism (804) is rotatably attached to one side (either 806 or 808) of the display screen (800) and is pivotally attached to the computer base (802), to allow the display screen (800) to move vertically and rotate relative to the computer base (802). The support mechanism (804) could be on one or the other side but not be on both sides (806 and 808) of the computer because this would not allow the display screen (800) to move horizontally.

It should be understood that the foregoing relates to preferred embodiments of the invention and that modifications may be made without departing from the spirit and scope of the invention as set forth in the following claims.

The invention claimed is:

1. An adjustable laptop computer monitor assembly, comprising:
   a flat panel display assembly comprising a display screen and support electronics for said display screen;
   a computer base that houses an associated microprocessor and a portion of said support electronics for said display screen, wherein said computer base and said flat panel display form a laptop computer monitor assembly such that said flat panel display completely covers said computer base when in a closed position;
   at least one rail along a back portion of said display screen;
   at least one support mechanism in communication with said at least one rail and movably attached to said computer base, wherein said at least one support mechanism allows said display screen to move vertically relative to said computer;
   a pivot hinge attached to one end of said rail and said computer base to allow said display screen to rotate open and closed relative to said computer base;
   at least one horizontal extender rail in communication with said at least one support mechanism at a 90 degree angle, contained within said back portion of said display screen and intersecting each said at least one rail,
   wherein said flat panel display moves vertically along said at least one rail relative to said computer base, horizontally along said at least one horizontal extender rail relative to said computer base and pivotally tilts around said pivot hinge relative to said computer base.

2. An adjustable laptop computer monitor assembly as in claim 1, further comprising at least one horizontal extender rail in communication with said at least support mechanism at a 90 degree angle and contained within said back portion of said display screen.

3. An adjustable laptop computer monitor assembly as in claim 1, wherein said support electronics are contained within said at least one support mechanism.

4. An adjustable laptop computer monitor assembly as in claim 1, wherein said support electronics are in wireless communication with said associated microprocessor.

5. An adjustable laptop computer monitor assembly as in claim 1, wherein said display screen is selected from the group consisting of electroluminescent, Liquid Crystal Displays (LCD), plasma panel and field emission displays.

6. An adjustable laptop computer monitor assembly as in claim 1, wherein said at least one support mechanism is movably attached to said computer base in the middle third of said computer base.

7. An adjustable laptop computer monitor assembly as in claim 1, further comprising at least one pivot hinge in communication with an end of said at least one support mechanism.

8. An adjustable laptop computer monitor assembly as in claim 1, wherein said rail has groove stops providing different heights for said display screen.

9. An adjustable laptop computer monitor assembly as in claim 1, wherein said rail has at least two cut outs and further comprising an attachment means having an opposing cut out shaped release button, wherein said release button accepts said rail and allows said monitor to move along said rail.

10. An adjustable laptop computer monitor assembly as in claim 1, further comprising a pivot means in communication with said computer base and a first end of said support mechanism and an attachment means in rotatable and vertical communication with said laptop computer monitor assembly and a second end of said support mechanism.

11. An adjustable laptop computer monitor assembly as in claim 1, wherein said support mechanism is further comprised of a telescoping mechanism.

12. An adjustable laptop computer monitor assembly, comprising:
    a flat panel display assembly comprising a display screen and support electronics for said display screen;
    a computer base that houses an associated microprocessor and a portion of said support electronics for said display screen, wherein said computer base and said flat panel display form a laptop computer monitor assembly such that said flat panel display completely covers said computer base when in a closed position;
    at least one support mechanism, wherein said at least one support mechanism is partially contained within least one rail and allows said display screen to move vertically relative to said computer;
    a pivot hinge attached to one end of said rail and said computer base to allow said display screen to rotate open and closed relative to said computer base;
    at least one horizontal extender rail in communication with said at least one support mechanism at a 90 degree angle, contained within said back portion of said display screen and intersecting each said at least one rail,
    wherein said flat panel display moves vertically along said at least one rail relative to said computer base, horizontally along said at least one horizontal extender rail relative to said computer base and pivotally tilts around said pivot hinge relative to said computer base.

13. An adjustable laptop computer monitor assembly as in claim 12, further comprising at least one rail, wherein said at least one rail is in communication with a back portion of said display screen and fixedly attached to said computer base.

14. An adjustable laptop computer monitor assembly as in claim 12, further comprising at least one horizontal extender rail in communication with said at least one support mechanism at a 90 degrees angle and contained within said back portion of said display screen.

15. An adjustable laptop computer monitor assembly as in claim 12, wherein said support electronics are contained within said at least one support mechanism.

16. An adjustable laptop computer monitor assembly as in claim 12, wherein said support electronics are in wireless communication with said associated microprocessor.

17. An adjustable laptop computer monitor assembly as in claim 12, wherein said display screen is selected from the group consisting of electroluminescent, Liquid Crystal Displays (LCD), plasma panel and field emission displays.

18. An adjustable laptop computer monitor assembly as in claim 12, wherein said at least one support mechanism is fixedly attached to said computer base in the middle third of said computer base.

19. An adjustable laptop computer monitor assembly as in claim 12, further comprising at least one pivot hinge in communication with an end of said at least one support mechanism.

20. An adjustable laptop computer monitor assembly as in claim 12, wherein said support mechanism is further comprised of a telescoping mechanism.

* * * * *